United States Patent
Crouse

(10) Patent No.: US 11,887,108 B2
(45) Date of Patent: Jan. 30, 2024

(54) SYSTEM AND USER INTERFACE OF A USER DEVICE FOR MANAGING TOKENS ASSOCIATED WITH A USER

(71) Applicant: Capital One Services, LLC, McLean, VA (US)

(72) Inventor: Margaret Crouse, Burke, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/449,730

(22) Filed: Oct. 1, 2021

(65) Prior Publication Data

US 2023/0109299 A1    Apr. 6, 2023

(51) Int. Cl.
*G06Q 20/38*    (2012.01)
*G06Q 40/10*    (2023.01)
*G06V 20/10*    (2022.01)

(52) U.S. Cl.
CPC ........... *G06Q 20/381* (2013.01); *G06Q 40/10* (2013.01); *G06V 20/10* (2022.01)

(58) Field of Classification Search
CPC .... G06Q 20/381; G06Q 40/10; G06Q 20/405; G06Q 40/025; G06Q 30/0261; G06Q 50/167; G06Q 30/06; G06Q 20/3674; G06Q 20/20
USPC ...... 705/7.29, 14.33, 14.53, 16, 26.1, 26.41, 705/36 R, 39, 41, 44, 72, 310; 235/487, 235/492; 455/433; 382/124; 194/302
See application file for complete search history.

(56) References Cited

U.S. PATENT DOCUMENTS

| | | | |
|---|---|---|---|
| 7,044,368 B1 * | 5/2006 | Barron | G07F 7/0886 235/492 |
| 8,090,358 B2 * | 1/2012 | Sherman | G06Q 30/0267 455/433 |
| 8,606,645 B1 * | 12/2013 | Applefeld | G06Q 30/02 705/26.1 |
| 9,016,584 B2 * | 4/2015 | Doughty | G06Q 20/4014 235/487 |

(Continued)

FOREIGN PATENT DOCUMENTS

| | | |
|---|---|---|
| EP | 1575004 A1 | 9/2005 |
| EP | 2787468 A1 | 10/2014 |

OTHER PUBLICATIONS

Blomqvist, "Secrets Management in a Multi-Cloud Kubernetes Environment," Master of Science in Technology Thesis, University of Turku, Department of Computing, Software Engineering, May 2021, 63 Pages.

*Primary Examiner* — Hani M Kazimi
*Assistant Examiner* — Sanjeev Malhotra
(74) *Attorney, Agent, or Firm* — Harrity & Harrity, LLP

(57) ABSTRACT

In some implementations, a user device may receive, via an application, object information associated with an object, wherein the object information identifies a value associated with the object and a location of the object. The user device may determine an adjustment factor that is associated with transactions performed in a region of the location. The user device may determine, based on the value and the adjustment factor, an adjusted value associated with the object. The user device may generate, based on the adjusted value, an arrangement of tokens for a transaction involving the object and the tokens. The user device may output, via a user interface of the application, an indication of the arrangement of tokens to assist a user with engaging in the transaction.

20 Claims, 7 Drawing Sheets

(56) References Cited

U.S. PATENT DOCUMENTS

| | | | |
|---|---|---|---|
| 9,412,100 B1* | 8/2016 | Shearer | G06Q 20/108 |
| 9,412,121 B2* | 8/2016 | Tatzel | G06Q 30/0276 |
| 9,704,161 B1* | 7/2017 | Oates | G06Q 20/00 |
| 10,089,630 B2* | 10/2018 | Clyne | G06Q 30/0255 |
| 10,318,569 B1* | 6/2019 | Funk | G06Q 20/3278 |
| 10,332,150 B2* | 6/2019 | Hannan | G06Q 30/0261 |
| 10,423,920 B1* | 9/2019 | Shearer | G06Q 20/00 |
| 10,438,185 B1* | 10/2019 | Shearer | G07D 11/20 |
| 10,686,766 B2* | 6/2020 | Jahner | H04L 63/10 |
| 11,334,893 B1* | 5/2022 | Mattison, Sr. | G07D 11/32 |
| 11,720,896 B1* | 8/2023 | Kalaboukis | G06F 16/9535 705/44 |
| 2005/0169504 A1* | 8/2005 | Black | G06Q 20/341 382/124 |
| 2006/0201775 A1* | 9/2006 | Tedesco | G06Q 20/04 194/302 |
| 2007/0012542 A1* | 1/2007 | Tedesco | G06Q 20/3674 194/302 |
| 2007/0073619 A1* | 3/2007 | Smith | G07C 9/257 705/41 |
| 2008/0133419 A1* | 6/2008 | Wormington | G06Q 20/12 705/64 |
| 2011/0166992 A1* | 7/2011 | Dessert | G06Q 20/0655 705/39 |
| 2011/0218868 A1* | 9/2011 | Young | G06Q 40/02 705/16 |
| 2012/0296849 A1* | 11/2012 | Lortscher, Jr. | G06Q 40/02 705/36 R |
| 2012/0310702 A1* | 12/2012 | Paulsen | H04L 63/1425 705/7.29 |
| 2012/0310778 A1* | 12/2012 | Paulsen | H04L 67/02 705/26.41 |
| 2014/0081859 A1* | 3/2014 | Nuzzi | G06Q 20/3221 705/44 |
| 2014/0236746 A1* | 8/2014 | Roever | G06Q 20/04 705/26.1 |
| 2014/0279503 A1* | 9/2014 | Bertanzetti | G06Q 20/3221 705/44 |
| 2014/0310080 A1* | 10/2014 | Salmon | G06Q 30/0233 705/14.33 |
| 2015/0026080 A1* | 1/2015 | Roever | G06Q 20/0855 705/310 |
| 2015/0088751 A1* | 3/2015 | Grigg | G06Q 20/4016 705/44 |
| 2015/0220908 A1* | 8/2015 | Young | G06Q 40/02 705/39 |
| 2015/0302411 A1* | 10/2015 | Bondesen | G06Q 20/3224 705/72 |
| 2016/0019547 A1* | 1/2016 | Gurnani | G06Q 20/3223 705/44 |
| 2016/0086222 A1* | 3/2016 | Kurapati | G06Q 40/08 705/14.53 |
| 2016/0260089 A1* | 9/2016 | Chen | G06Q 20/367 |
| 2017/0032382 A1* | 2/2017 | Shulman | G06Q 30/0185 |
| 2017/0061405 A1* | 3/2017 | Bryant | G06Q 20/4014 |
| 2017/0091765 A1* | 3/2017 | Lloyd | G06Q 20/321 |
| 2017/0293899 A1* | 10/2017 | Furche | H04L 9/3213 |
| 2018/0293573 A1* | 10/2018 | Ortiz | G06Q 20/102 |
| 2018/0300717 A1* | 10/2018 | Haque | H04L 9/3213 |
| 2019/0130391 A1* | 5/2019 | Wright | G06F 21/645 |
| 2019/0164152 A1* | 5/2019 | Bucher | H04L 9/3239 |
| 2019/0164165 A1* | 5/2019 | Ithabathula | G06F 21/34 |
| 2019/0303925 A1* | 10/2019 | Harris | G06Q 20/12 |
| 2019/0378135 A1* | 12/2019 | Lloyd | G06Q 20/4015 |
| 2020/0186416 A1* | 6/2020 | Hashimoto | G06F 8/60 |
| 2020/0202324 A1* | 6/2020 | Sarin | G06Q 20/3672 |
| 2020/0265426 A1* | 8/2020 | Furche | G06Q 20/3825 |
| 2020/0366742 A1* | 11/2020 | Van Os | H04W 12/06 |
| 2020/0394626 A1* | 12/2020 | Kikinis | G06Q 20/223 |
| 2021/0201288 A1* | 7/2021 | Van Os | G06Q 20/342 |
| 2021/0201328 A1* | 7/2021 | Gunther | G06Q 20/322 |
| 2021/0224790 A1* | 7/2021 | Campos | G06Q 20/3276 |
| 2021/0233162 A1* | 7/2021 | Hockey | G06F 16/951 |
| 2021/0272101 A1* | 9/2021 | Kalgi | G06Q 20/325 |
| 2021/0358062 A1* | 11/2021 | Richards | G06Q 50/16 |
| 2022/0012739 A1* | 1/2022 | Germain | G06Q 20/409 |
| 2022/0040562 A1* | 2/2022 | Walker | G07F 17/3251 |
| 2022/0067702 A1* | 3/2022 | Dunjic | G06Q 20/381 |
| 2022/0084009 A1* | 3/2022 | Sarin | G06Q 20/3821 |
| 2022/0101311 A1* | 3/2022 | Mehrhoff | G06Q 20/381 |
| 2022/0114571 A1* | 4/2022 | Ortiz | G06Q 20/40 |
| 2022/0253832 A1* | 8/2022 | Hammad | G06Q 20/3276 |
| 2022/0253837 A1* | 8/2022 | Schneider | G06Q 20/065 |
| 2022/0270078 A1* | 8/2022 | Pomeroy | G06Q 20/4018 |

* cited by examiner

SYSTEM AND USER INTERFACE OF A USER DEVICE FOR MANAGING TOKENS ASSOCIATED WITH A USER

BACKGROUND

Merchants in different jurisdictions may utilize or accept different currencies. Furthermore, different currencies may have different denominations and exchange rates between currencies may fluctuate according to economic conditions of the jurisdictions. Furthermore, different adjustment factors may impact transactions in different jurisdictions (e.g., based on types of objects or services that are being received, based on types of transactions that are being performed, and so on).

SUMMARY

Some implementations described herein relate to a user device for providing transaction information associated with an object. The user device may include one or more memories and one or more processors communicatively coupled to the one or more memories. The user device may be configured to receive token information associated with available tokens of a user. The user device may be configured to store, in association with a user account of the user and based on the token information, available token information associated with the available tokens. The user device may be configured to receive object information associated with an object. The user device may be configured to determine an adjustment factor that is associated with the location. The user device may be configured to determine, based on the value and the adjustment factor, an adjusted value of the object for an execution of the transaction. The user device may be configured to determine, based on the adjusted value and the available token information, an arrangement of one or more of the available tokens for a transaction involving the object and the tokens. The user device may be configured to output an indication of the arrangement on a display of the user device to indicate the arrangement.

Some implementations described herein relate to a non-transitory computer-readable medium that stores a set of instructions for a user device. The set of instructions, when executed by one or more processors of the user device, may cause the user device to receive, via a user interface, object information associated with an object. The set of instructions, when executed by one or more processors of the user device, may cause the user device to determine, based on the type of the object and the location, an adjustment factor associated with a transaction involving the object. The set of instructions, when executed by one or more processors of the user device, may cause the user device to determine, based on the value and the adjustment factor, an adjusted value of the object for the transaction. The set of instructions, when executed by one or more processors of the user device, may cause the user device to determine, based on the adjusted value, an arrangement of tokens that may be utilized in the transaction. The set of instructions, when executed by one or more processors of the user device, may cause the user device to outputting, via the user interface, an indication of the arrangement of the tokens.

Some implementations described herein relate to a method for providing transaction information associated with an object. The method may include receiving, by a device and via an application, object information associated with an object, where the object information identifies a value associated with the object and a location of the object. The method may include determining, by the device, an adjustment factor that is associated with transactions performed in a region of the location. The method may include determining, by the device and based on the value and the adjustment factor, an adjusted value associated with the object. The method may include generating, by the device and based on the adjusted value, an arrangement of tokens for a transaction involving the object and the tokens. The method may include outputting, by the device and via a user interface of the application, an indication of the arrangement of tokens to assist a user with engaging in the transaction.

DETAILED DESCRIPTION

Figure 1A:
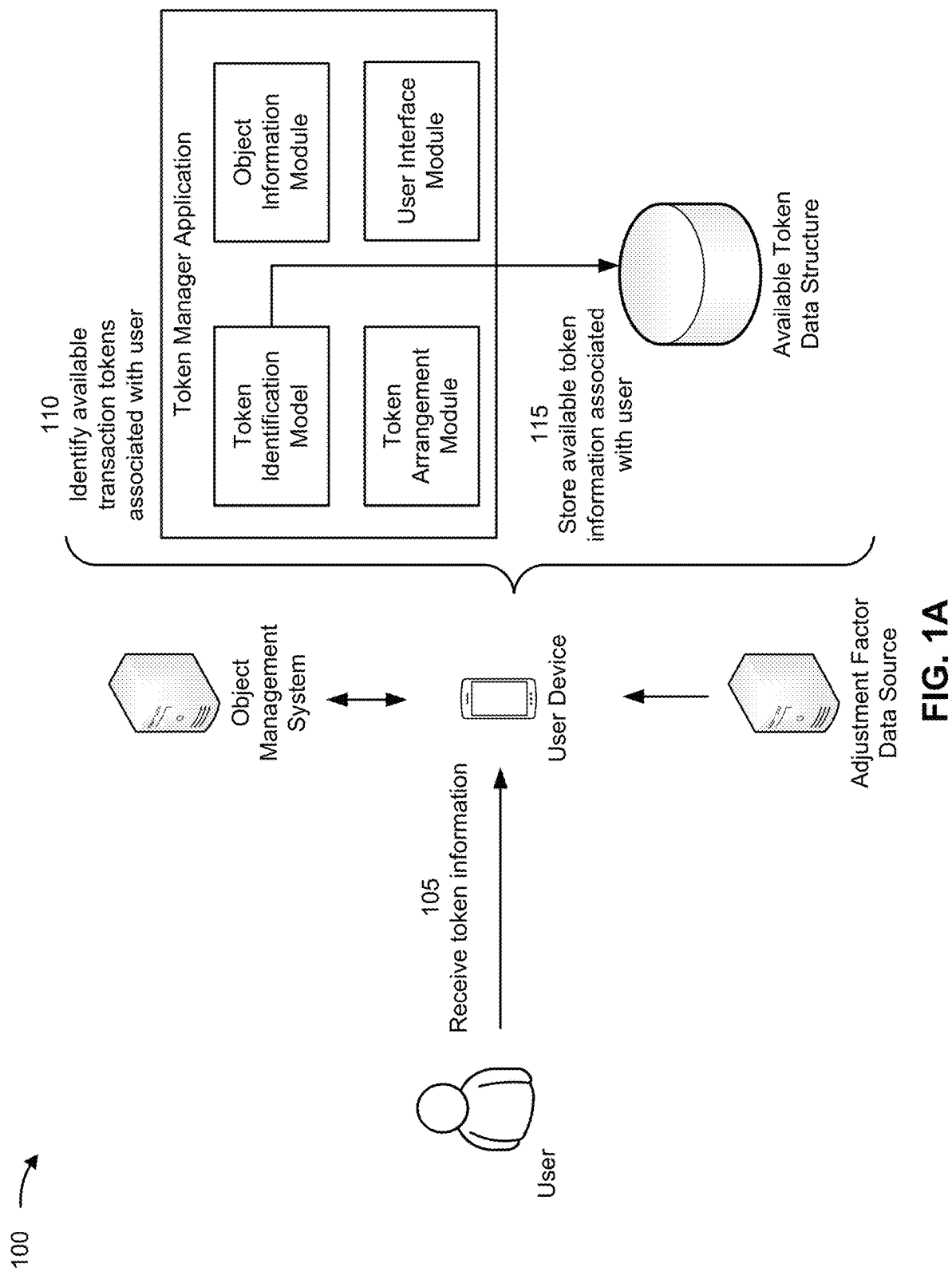
FIGS. 1A-1C are diagrams of an example implementation associated with managing tokens associated with a user of a user device, as described herein.

The following detailed description of example implementations refers to the accompanying drawings. The same reference numbers in different drawings may identify the same or similar elements.

Various jurisdictions utilize one or more currencies for transactions. Certain laws and/or norms within a jurisdiction can impact transactions differently from another jurisdiction. For example, a tax rate or a conventional tipping rate in one jurisdiction may be different than in another jurisdiction. Accordingly, a transaction involving a particular object and/or service may be different (e.g., a currency value of the transaction) depending on the jurisdiction. While many objects and/or services are typically marked with a corresponding currency value (e.g., a price for the object and/or service), such currency values to not account for certain adjustment factors that may be applied to the object or service. Accordingly, at a transaction terminal (e.g., a point-of-sale terminal), the individual may be asked to pay an adjusted value in a transaction for an object (e.g., an adjusted currency value that is different from the currency value than what is marked on an object).

An individual may be unfamiliar with certain currencies used in transactions for objects or services and/or adjustment factors that are to be applied to the objects and/or services in a particular jurisdiction. For example, an individual that is traveling to an unfamiliar geographical location or jurisdiction may not be aware of taxes being applied, tips that are to be applied, and/or other types of adjustments or fees that might be applied. Accordingly, the individual may need to attempt to guess currency values for transactions involving unfamiliar currencies (and/or denominations of currencies), may need to calculate or determine a conversion rate between currencies and/or denominations of currencies, and/or may need to learn adjustment factors to determine an adjusted value for a transaction. Moreover, an adjustment factor for a jurisdiction may change over time (e.g., due to a change in a tax law and/or a change in a tipping convention in the jurisdiction). Accordingly, there is a need to facilitate management of tokens associated with a user to assist the user with engaging in transactions using the tokens.

Some implementations described herein provide a system and/or a user device that is configured to facilitate management of tokens of a user to enable the user to determine an adjusted value for an object (and/or a service) and/or determine whether the user is capable of engaging in a transaction for the object using tokens that are available to the user. For example, as described herein, the user device (e.g., via an application) may receive token information associated with a user and/or a location of the user. The user device may receive object information associated with an object and determine an adjustment factor associated with the object and/or a location of the object (e.g., a location for a transaction, such as a location of the user and/or the user device). The user device may obtain the adjustment factor from an adjustment factor data source that is configured to track and/or indicate adjustment factors for one or more objects and/or types of objects, as described herein. Accordingly, based on determining an adjustment factor for an object, the user device may indicate an arrangement of tokens (e.g., tokens that indicated as available to the user) that can be utilized to engage in a transaction for the object.

In this way, the system and/or the user device may automatically determine, for an object, an adjusted value for the object according to the location or type of the object, determine an arrangement of tokens (e.g., bills and/or coins of a currency that is accepted in a jurisdiction associated with the location) for a transaction involving the object, and facilitate the transaction by indicating the arrangement via a display of the user device. In this way, the system and/or the user device may improve a user experience involved in using tokens for transactions. Furthermore, the system and/or the user device may conserve resources associated with cancelling a transaction for an object due to a user being unfamiliar with a currency and/or an adjustment factor involved in the transaction. More specifically, the system and/or the user device may conserve computing resources (e.g., processor and/or memory resources) of a transaction terminal that is used to initiate and/or cancel a transaction for an object without using the system and/or user device (or the application of the user device) as described herein.

Figure 1B:
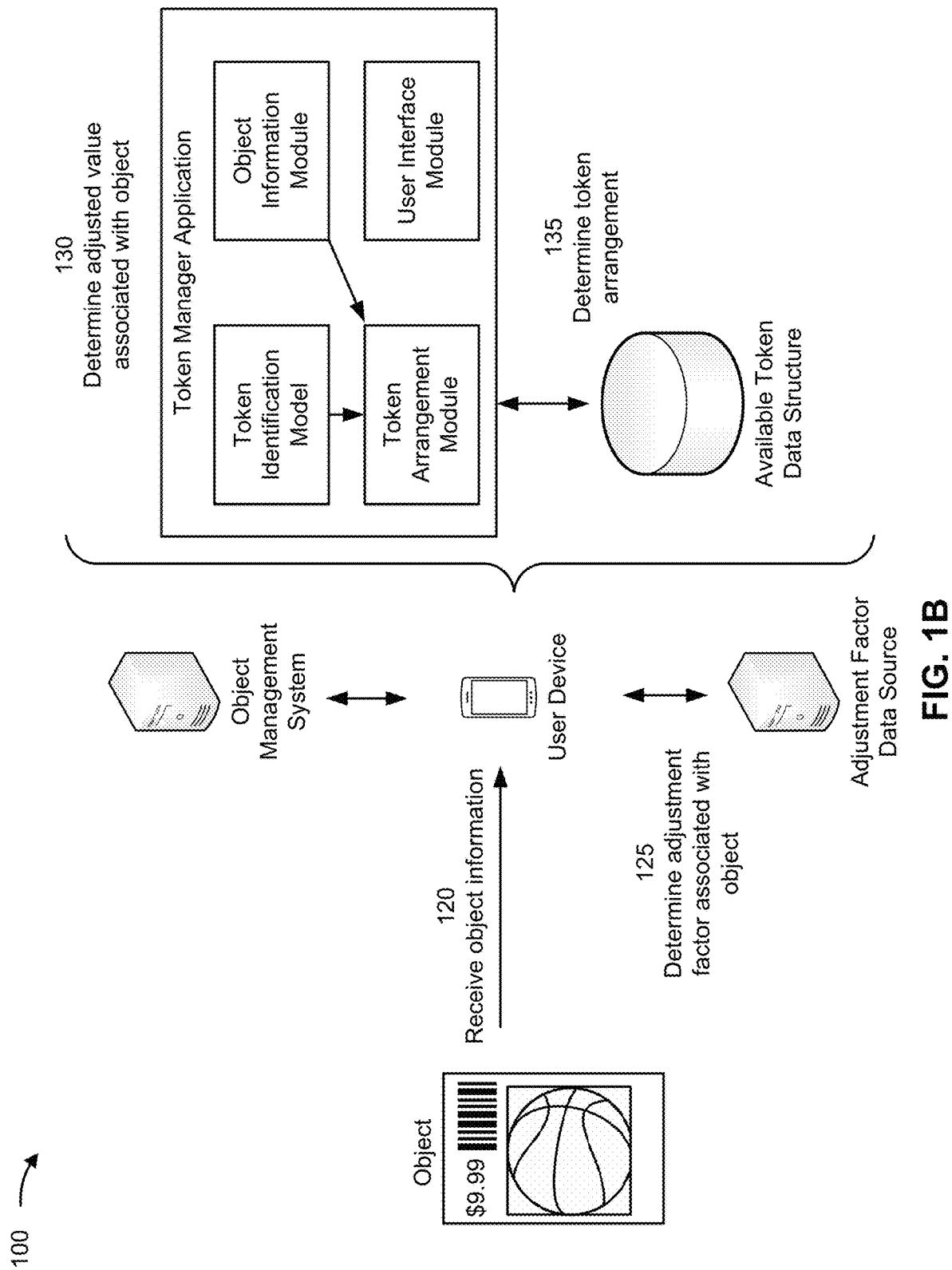
Figure 1C:
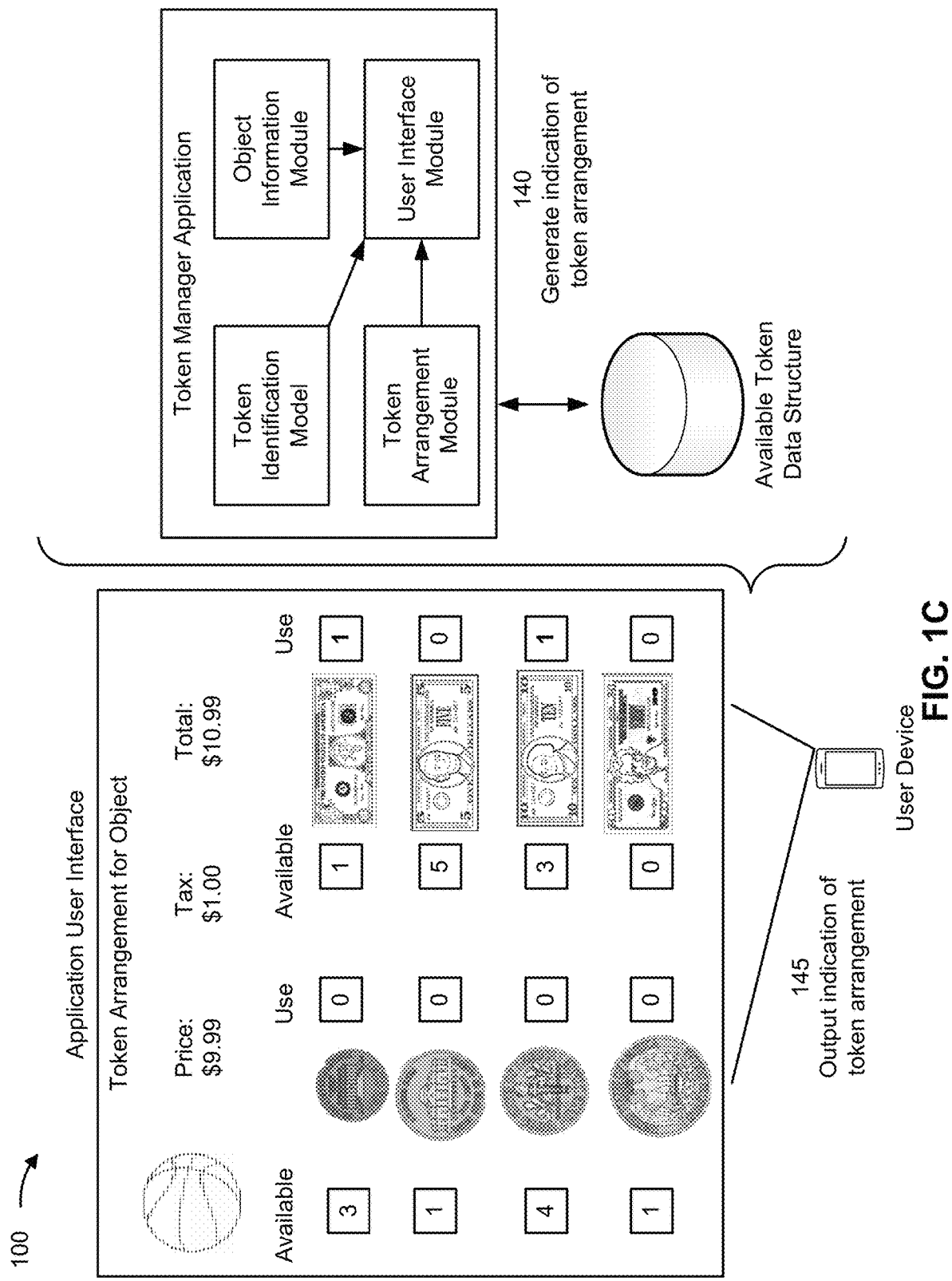

FIGS. 1A-1C are diagrams of an example implementation 100 associated with managing tokens associated with a user of a user device. As shown in FIGS. 1A-1C, example implementation 100 includes a user device, an object management system, and an adjustment factor data source. These devices are described in more detail below in connection with FIG. 3 and FIG. 4.

In example implementation 100, the user device includes a token manager application may be installed on the user device to facilitate and/or manage tokens (or available tokens) associated with a user of the device, as described herein. As shown in FIGS. 1A-1C, the token manager application may include a token identification model, an object information module, a token arrangement module, and a user interface module.

As shown in FIG. 1A, and by reference number 105, the user device receives token information. The token information may include information associated with tokens that are available to a user (which may be referred to as "available tokens"). The tokens may be one or more denominations (e.g., bills, coins, or other types of fiat currency) of a type of currency that is associated with a location of the user and/or the user device (e.g., as determined or indicated by a geolocation sensor of the user device, such as a global positioning system (GPS) sensor).

Correspondingly, the received token information may specify denominations of a type of currency and/or corresponding quantities of the denominations of the type of currency that are available to the user (e.g., on the user's person and/or available to the user for a transaction). For example, the user may input the token information into the user device (e.g., using a user interface of the token manager application). More specifically, the user may indicate (e.g., via the user interface) the corresponding quantities of available denominations (e.g., coins and/or bills) of a particular type of currency.

In some implementations, as described elsewhere herein, the token information may be received and/or determined from one or more images of the available tokens. For example, the user may capture an image of a token (e.g., using a camera of the user device), and the user device may process the image (e.g., via an image processing model, such as the token identification model of the token manager application) to identify the token information (e.g., a value of the token and/or a type of currency of the token).

Accordingly, the user device may receive (e.g., from the user) and/or determine (e.g., from an image captured by the user) a value, a quantity, and/or a type of a token that is available to a user.

As further shown in FIG. 1A, and by reference number 110, the user device identifies available transaction tokens associated with the user. For example, the user device (e.g., via the token identification model) may process the token information and/or an image of available tokens to identify a set of tokens (e.g., a set of bills and/or a set of coins) that are available to the user for a transaction.

The user device may aggregate token information according to the types of the tokens. For example, the user device (e.g., via the token management module) may count corresponding quantities of denominations of currencies that are available to the user. In some implementations, the token information may indicate whether certain tokens that were previously available to the user were spent. In this way, the user device may track (e.g., across transactions) which tokens are available to the user.

As further shown in FIG. 1A, and by reference number 115, the user device stores the available token information that is associated with the user. For example, the user device may store, based on the identified tokens in the token information, available token information in an available token data structure of the user device. The available token data structure may be associated with the token manger application and/or maintained in association with a user account of the user. The user account may be associated with the user based on the user registering the user account with the token management application (e.g., to permit the token management application to track available tokens associated with the user and/or facilitate a transaction involving the tokens for the user). The user device may update the stored available information in the available token data structure according to updates to the available tokens (as indicated by newly received token information). In this way, the available token data structure, at a given moment, may indicate which tokens have been indicated or are indicated as available to a user.

As shown in FIG. 1B, and by reference number 120, the user device receives object information associated with an object. For example, the user device may receive an identifier of an object, a type of an object (e.g., a type of a product), and/or a value of an object (e.g., a marked currency value that is indicated on the object).

Additionally, or alternatively, the user device may receive the object information in association with a read of a barcode associated with the object. The read of the barcode may be performed in association with a read operation of the token manager application and/or the camera. The read operation may involve accessing the object information from the object management system. For example, the read operation may involve capturing an image of the barcode, processing the image to identify and read the barcode (e.g., in association with decoding the barcode), and requesting the object management system to provide the object information according to the read operation. The object management system may provide the object information based on the request including read data associated with the barcode of the object and/or the read data being mapped to the object information. In this way, the user device may receive the object information associated with the object based on the barcode being mapped or associated with the object, as indicated by the object management system.

In some implementations, the object information may include a location associated with the object. For example, a location of the object may be determined using a geolocation sensor of the user device. Additionally, or alternatively, the user may provide location information that is associated with the object or a potential transaction involving the object.

The user may provide the object information (and/or perform a read of the barcode) while the user is shopping at a store of a merchant. As shown in FIG. 1B, the object may include a ball that has a value of $9.99. For example, the user may have an interest in engaging in a transaction with the merchant to purchase the ball (e.g., a purchase of the object using the available tokens). However, the value of $9.99, depending on whether an adjustment factor is to be applied to the ball (based on whether a particular tax rate is applied for transactions involving balls at the location of the transaction), $9.99 may not be a value of the transaction for the ball. Accordingly, as described herein, the user may provide the object information (and/or cause the user device to receive the object information) to receive an adjusted value of the ball (e.g., based on a location of the object, the user, and/or the merchant) and/or an indication of an arrangement of tokens that can be used to engage in a transaction for the ball.

As further shown in FIG. 1B, and by reference number 125, the user device determines an adjustment factor that is associated with the object. The user device may determine the adjustment factor based on sending a query to the adjustment factor data source. For example, the user device may send a query that includes information from the object information (e.g., a type of the object and/or a location for a transaction involving the object) and receive, from the adjustment factor data source, a response to the query that includes the adjustment factor.

The adjustment factor may be associated with values of transactions involving the object and/or transactions that are performed in a region (e.g., a jurisdiction, such as a state or country) associated with the object. The adjustment factor may be received from the adjustment factor data source. The adjustment factor data source may be associated with the token manager application and/or a third party system that is configured to maintain and/or indicate adjustment factors associated with certain types of objects and/or certain locations (or jurisdictions). The adjustment factor data source may map adjustment factors to the types of objects and/or the locations based on identifying updates to adjustment factors (e.g., updates to tax laws and/or changes in tipping practices, which may be indicated through crowd sourcing, surveys, or the like). The adjustment factor data source may be configured to automatically indicate or provide (e.g., via a real simple syndication (RSS) feed or other communication interface) changes to adjustment factors to the user device based on the token manager application being installed on the user device and/or based on the user having a user account with the token manager application.

In some implementations, the adjustment factor may correspond to a tax rate that is associated with the type of the object and/or the location of the object (and/or a location of the user, the user device, and/or a merchant associated with the object). For example, the adjustment factor data source may indicate a sales tax rate that is applied to items (e.g., balls or other retail-type items) in transactions that are a same type of the object and/or a tax rate that is applied to items in transactions in the same region or same jurisdiction associated with the location identified in the object information. Additionally, or alternatively, the adjustment factor may correspond to a tipping rate that is associated with the type of the object and/or the location. Accordingly, the adjustment factor data source may indicate a typical tipping rate that is applied to the user receiving the object (e.g., a tipping rate applied if the user were to receive food or a waiter service at a restaurant).

In this way, the user device (e.g., via the token manager application and/or the adjustment factor data source) may determine the adjustment factor associated with a transaction involving the object, based on the type of the object and/or the location identified in the object information.

As further shown in FIG. 1B, and by reference number 130, the user device determines an adjusted value that is associated with the object. The adjusted value may correspond to an actual cost (or currency value) of the object for execution of a transaction involving the object (e.g., if the object were involved in a transaction using the available tokens associated with the user). The adjusted value may be indicated in association with (or based on) a type of currency associated with the available tokens of the user. For example, the adjusted value may be determined according to the type of currency that is indicated in the token information (and/or the stored available token information).

The user device may determine the adjusted value by applying the adjustment factor to a value of the object indicated in the object information. Accordingly, the adjusted value may indicate a total value associated with a purchase of the object including tax (e.g., according to a tax rate that is to be applied at the location) and/or a tip (e.g., according to the tipping rate that should be applied at the location). In this way, the user may verify (e.g., via the token manager application) that the adjusted value is less than or equal to a total spend value associated with the available tokens (e.g., to permit the user to engage in a transaction for the object).

As further shown in FIG. 1B, and by reference number 135, the user device determines a token arrangement. The arrangement of the tokens may involve an indication of one or more denominations of a type of currency identified in the token information. The user device may determine the token arrangement that is based on the adjusted value. More specifically, the user device may determine a token arrangement that has a combined value that is greater than or equal to the adjusted value.

In some implementations, the user device, via the token manager application, may determine an arrangement of one or more denominations associated with the available tokens that are associated with the user. For example, based on the adjusted value and the available token information, the user device may indicate which set of the available tokens may be utilized to engage in a transaction for the object (e.g., if the total spend value of the available tokens is greater than the adjusted value).

In this way, the user device may determine an arrangement of tokens (e.g., an arrangement of the tokens that are available to the user) that may be utilized to engage in a transaction for an object based on a value of the object and/or an adjusted value of the object.

As shown in FIG. 1C, and by reference number 140, the user device generates an indication of the token arrangement. For example, the user device, according to the user interface, may cause the user interface module to generate the arrangement based on corresponding quantities of available tokens and the adjusted value. In example implementation 100, based on the adjusted value being $10.99, as determined from a 10% adjustment factor increase ($9.99 value+$1.00 tax), the token arrangement for a transaction involving the object may indicate that the user may use a quantity of currencies that satisfy the adjusted value (e.g., $11.00). The user device may indicate the quantities of the denominations based on the token information (e.g., as indicated by the corresponding "Available" fields of the denominations) indicating that the user is associated with at least the quantities of the denominations (e.g., the user has an available $1 bill and an available $10 bill).

In this way, the user device may generate the arrangement based on respective quantities of the denominations and/or spend values associated with the denominations (e.g., to generate a token arrangement of available tokens with a combined value that is greater than or equal to the adjusted value of the ball).

As further shown in FIG. 1C, and by reference number 145, the user device outputs the indication of the token arrangement. For example, the user device may present, via a display of the user device, the token arrangement to indicate respective quantities of the denominations that may be used to engage in a transaction for the ball. In example implementation 100, the arrangement of the tokens includes a first denomination of a type of currency ($1 bill) and a second denomination ($10 bill) of the type of currency ($). As described above, the first denomination and the second denomination may be been selected to be included in the arrangement based on the first denomination and the second denomination being identified (e.g., in the token information) as available to the user.

In this way, the user device, via the user interface of the token manager application may output an indication of the arrangement of tokens to assist a user with engaging in the transaction.

According to some implementations, the token manager application may received updated token information based on the user engaging in the transaction (e.g., using the identified tokens in the token arrangement). For example, the user device may receive feedback from the user that the tokens were utilized in a transaction (e.g., based on a prompt to the user via the user interface). Accordingly, the user device may update the token information to indicate updated available tokens of the user (e.g., which would be zero $1 bills and two $10 bills in example implementation 100).

In this way, a system and/or a user device, as described herein, may permit a user to identify tokens that may be used in association with a potential transaction involving an object based on an availability of the tokens to the user and/or based on an adjusted value of the object. Accordingly, without the user having to interact with a point of sale terminal (or representative of a merchant), the user may verify, prior to engaging in the transaction, that a total spend value of available tokens to the user is greater than or equal to an adjusted value for the potential transaction.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
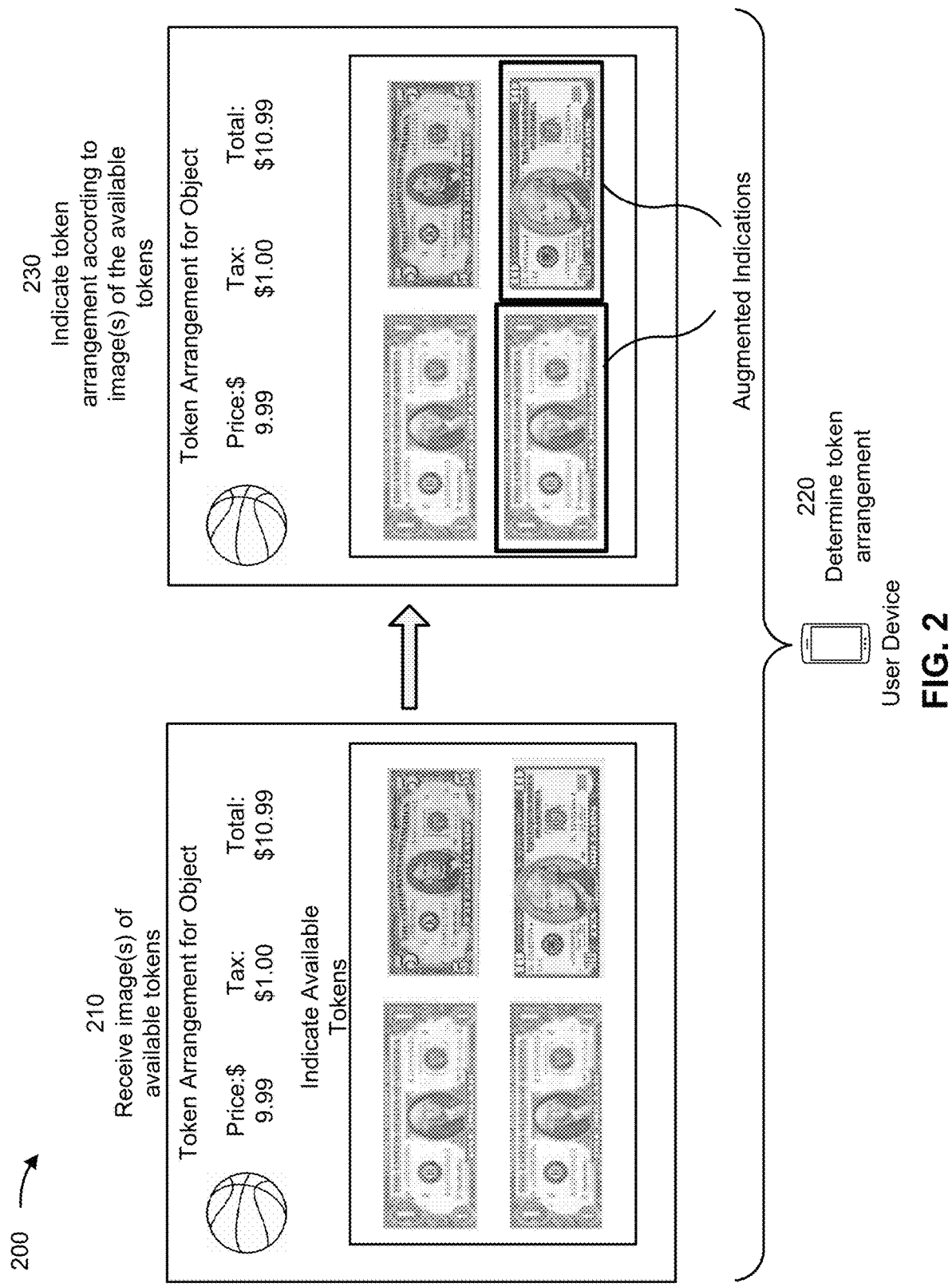
FIG. 2 is a diagram of an example implementation associated with a user interface for managing tokens associated with a user of a user device, as described herein.

FIG. 2 is a diagram of an example implementation 200 associated with a user interface for managing tokens associated with a user of a user device. As shown in FIG. 2, example implementation 200 includes a user interface of a user device. These devices are described in more detail below in connection with FIG. 3 and FIG. 4.

As shown in FIG. 2, and by reference number 210, the user device receives one or more images of available tokens. For example, the user device may receive the images in association with receiving token information associated with available tokens associated with a user of the user device (e.g., the user of example implementation 100). More specifically, to provide the token information, once the user gains access to one or more tokens, the user may capture (e.g., using a camera of the user device and/or a feature of the token manager application of example implementation 100) one or more images that depict the tokens.

The user device may analyze, using an image processing technique, an image that depicts a token to obtain token information associated with the token. The image processing technique may be associated with the token identification model, such as an object recognition technique, an optical character recognition technique, an edge detection technique, or any other suitable image processing technique. Accordingly, the user device (e.g., via the token manager application) may identify (or determine) a token value associated with a token that is depicted in the received image.

As described elsewhere herein, based on the token value (or other token information, such as the type of currency associated with the token), the user device may determine available token information associated with the user. For example, as shown in example implementation 200, the one or more images may depict two $1 bills, a $5 bill, and a $10 bill. Correspondingly, as described herein, the user device may receive and/or determine available token information associated with available tokens of a user that indicates that the user is associated with the two $1 bills, the $5 bill, and the $10 bill.

As further shown in FIG. 2, and by reference number 220, the user device determines a token arrangement. The user device may determine the token arrangement as described above, at least, in connection with example implementation 100.

The user may determine the token arrangement according to the available token information that is determined from the one or more images that depict the available tokens associated with the user. Accordingly, as described elsewhere herein, the user device may identify available tokens that are associated with the user and select, from the available tokens, one or more of the tokens for the arrangement of tokens to be included in an indication of the arrangement of tokens.

As shown in FIG. 2, received images may include a first denomination (a $1 bill) and a second denomination (a $10 bill). Based on the adjusted value (shown as a total of $10.99) and values of the denominations of the available tokens, the user device (e.g., via a token arrangement module) may select one token that is the first denomination and one token that is the second denomination may be selected for an arrangement of tokens that may be utilized for an execution of a transaction involving the object. Accordingly, the user device may determine the arrangement based on a first value of the first denomination, a second value of the second denomination, and the value associated with the object.

As further shown in FIG. 2, and by reference number 230, the user device indicates the token arrangement according to the one or more images of the available tokens. For example, as shown, the user device may include an indication of which tokens (e.g., as depicted in the images) may be utilized for a transaction involving the object. More specifically, as shown, the user device (e.g., via the user interface module) may included augmented indications of which of the tokens can be used in the transaction for the object.

In some implementations, the received images may be included within a video stream (e.g., as frames of the video stream) from a camera of the user device (e.g., in a similar manner as a stream of images in a preview mode of a camera of the user device). In such a case, the indications may be indicated via augmented reality to cause the individual tokens, of the arrangement of tokens, to appear to be highlighted or selected on a display of the user device (e.g., a display that is presenting the live stream of images). Accordingly, using the augmented reality technique, the user device may identify the available tokens, determine values of the available tokens, and determine an arrangement of the available tokens that may be used in a transaction for an object based on a determined adjusted value of the object for the transaction.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
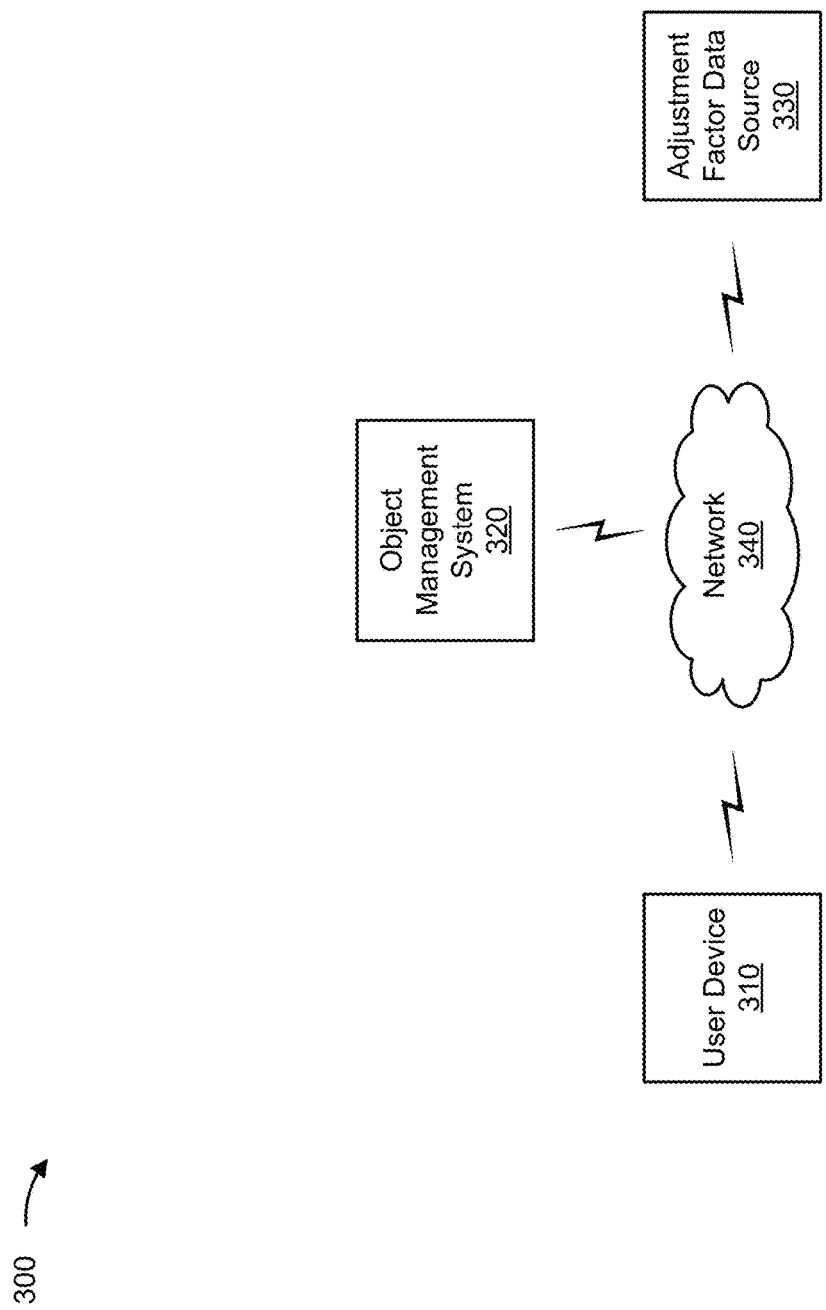
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, an object management system 320, an adjustment factor data source 330, and a network 340. Devices of environment 300 may interconnect via wired connections, wireless connections, or a combination of wired and wireless connections.

The user device 310 includes one or more devices capable of receiving, generating, storing, processing, and/or providing information associated with managing tokens associated with a user device, as described elsewhere herein. The user device 310 may include a communication device and/or a computing device. For example, the user device 310 may include a wireless communication device, a mobile phone, a user equipment, a laptop computer, a tablet computer, a desktop computer, a camera, a wearable communication device (e.g., a smart wristwatch, a pair of smart eyeglasses, a head mounted display, or a virtual reality headset), or a similar type of device.

The object management system 320 includes one or more devices capable of receiving, generating, storing, processing, providing, and/or routing information associated with one or more objects (e.g., one or more items that may be for sale or purchased via a transaction), as described elsewhere herein. The object management system 320 may include a communication device and/or a computing device. For example, the object management system 320 may include a server, such as an application server, a client server, a web server, a database server, a host server, a proxy server, a virtual server (e.g., executing on computing hardware), or a server in a cloud computing system. In some implementations, the object management system 320 includes computing hardware used in a cloud computing environment.

The adjustment factor data source 330 includes one or more devices capable of receiving, generating, storing, processing, and/or providing information associated with adjustment factors for transactions that are associated with objects, services, and/or locations, as described elsewhere herein. The adjustment factor data source 330 may include a communication device and/or a computing device. For example, the adjustment factor data source 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The adjustment factor data source 330 may communicate with one or more other devices of environment 300, as described elsewhere herein.

The network 340 includes one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
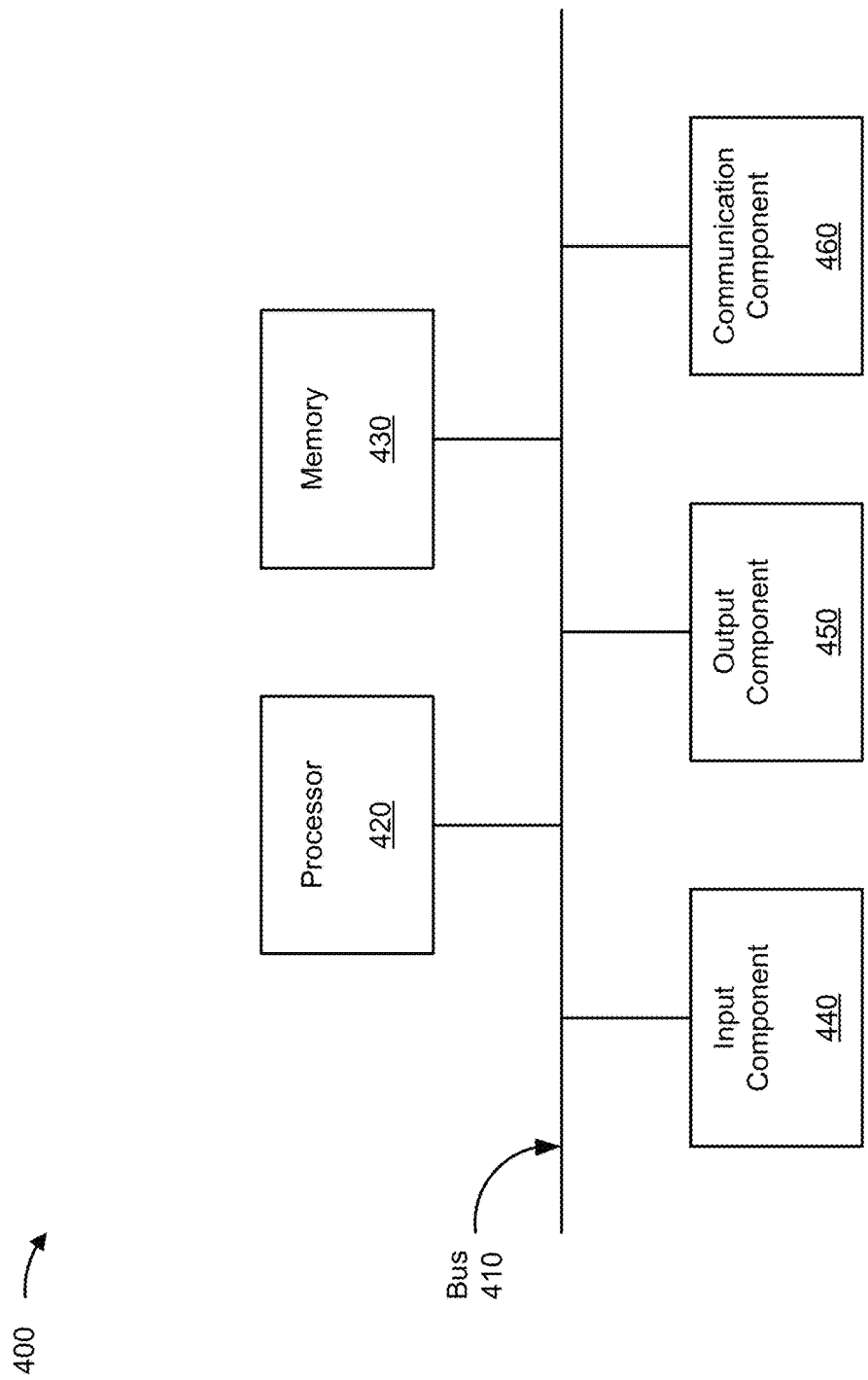
FIG. 4 is a diagram of example components of one or more devices of FIG. 3.

FIG. 4 is a diagram of example components of a device 400, which may correspond to the user device 310, the object management system 320, and/or the adjustment factor data source 330. In some implementations, the user device 310, the object management system 320, and/or the adjustment factor data source 330 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
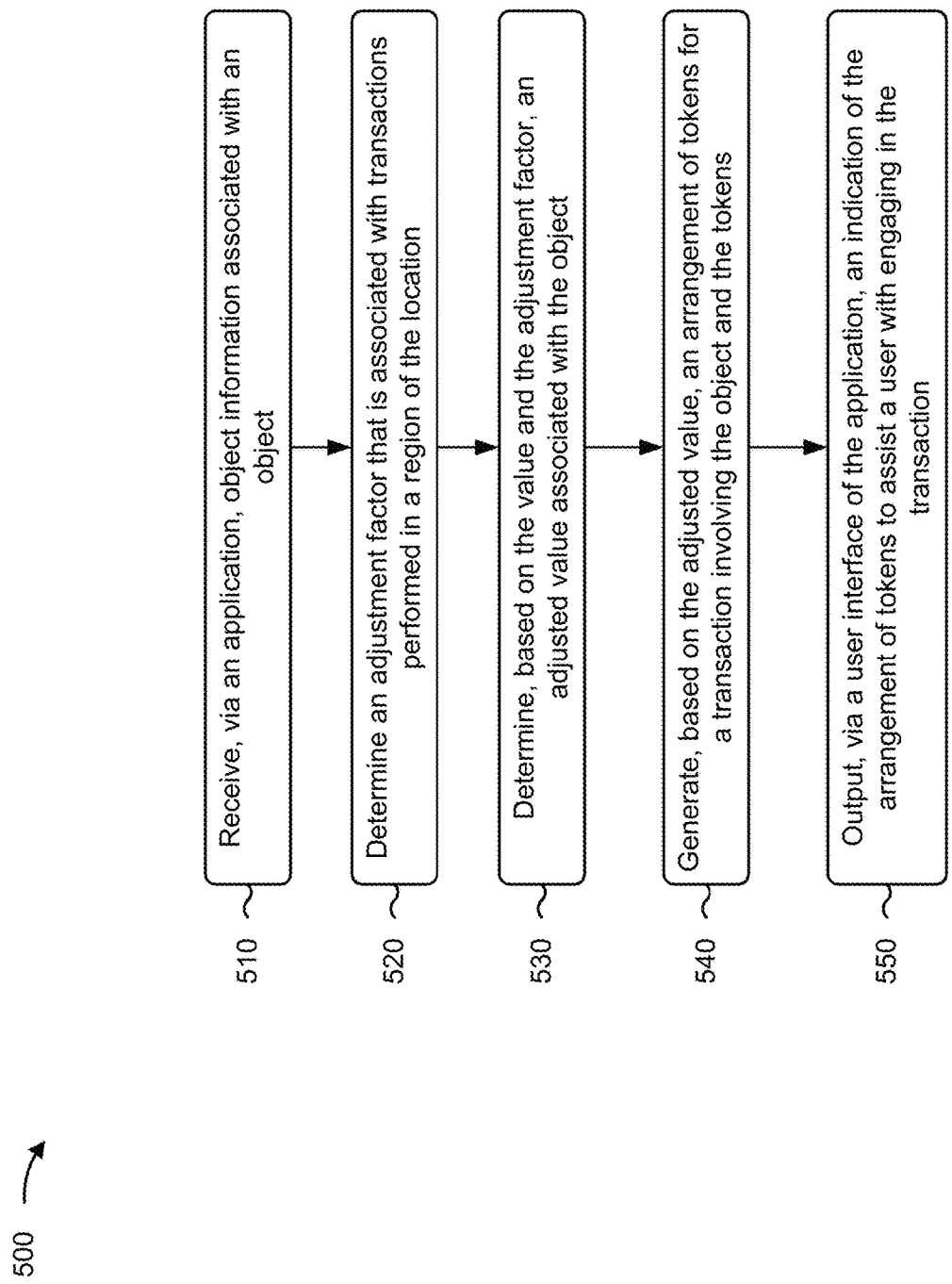
FIG. 5 is a flowchart of an example process associated with a system and a user interface of a user device for managing tokens associated with a user.

FIG. 5 is a flowchart of an example process 500 associated with a system and user interface of a user device for managing tokens associated with a user. In some implementations, one or more process blocks of FIG. 5 may be performed by a user device (e.g., user device 310). In some implementations, one or more process blocks of FIG. 5 may be performed by another device or a group of devices separate from or including the user device, such as the object management system 320 and/or the adjustment factor data source 330. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving, via an application, object information associated with an object, wherein the object information identifies a value associated with the object and a location of the object (block 510). As further shown in FIG. 5, process 500 may include determining an adjustment factor that is associated with transactions performed in a region of the location (block 520).

As further shown in FIG. 5, process 500 may include determining, based on the value and the adjustment factor, an adjusted value associated with the object (block 530). As further shown in FIG. 5, process 500 may include generating, based on the adjusted value, an arrangement of tokens for a transaction involving the object and the tokens (block 540). As further shown in FIG. 5, process 500 may include outputting, via a user interface of the application, an indication of the arrangement of tokens to assist a user with engaging in the transaction (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user device for providing transaction information associated with an object of a potential transaction, the user device comprising:
   one or more memories; and
   one or more processors, communicatively coupled to the one or more memories, configured to:
     capture, via a camera on the user device, a first image associated with a video stream related to one or more denominations of physical currency in possession by a user;
     process, based on using an image processing model associated with the user device, the first image,
       wherein the image processing model uses an image processing technique performed by the user device;
     generate, based on processing the first image, information related to the one or more denominations;
     capture, via the user device, a second image associated with the object;
     request, based on processing the second image with the image processing technique, object information associated with the object,
       wherein the object information identifies a value associated with the object and a location of the object, and
       wherein the location of the object is determined by a sensor device of the user device;
     receive the object information;
     determine, based on a query to an adjustment factor data source, an adjustment factor that is associated with the location;
     determine, based on the value and the adjustment factor, an adjusted value of the object for an execution of the transaction;
     determine, based on the adjusted value and the information related to the one or more denominations, an arrangement of the one or more denominations for a transaction involving the object and the one or more denominations; and
     output an indication of the arrangement on a display of the user device to indicate the arrangement,
       wherein outputting the indication comprises:
         augmenting the arrangement of the one or more denominations via augmented reality; and
         outputting information associated with the augmented reality.

2. The user device of claim 1, wherein the object information is received in association with a read of a barcode associated with the object,
   wherein the value is indicated in association with the read of the barcode, and
   wherein the one or more denominations have a combined value that is greater than or equal to the adjusted value of the object.

3. The user device of claim 1, wherein the one or more processors are configured to:
   receive, from the user device, a denomination image that depicts a denomination from the one or more denominations; and
   analyze, using the image processing technique, the image to identify a value associated with the one or more denominations,
   wherein information related to the one or more denominations is determined based on the value.

4. The user device of claim 1, wherein the information related to the one or more denominations identifies corresponding quantities associated with the one or more denominations that are identified in the information related to the one or more denominations and corresponding spend values associated with the information related to the one or more denominations,
   wherein the arrangement is generated based on the corresponding quantities and the corresponding spend values.

5. The user device of claim 1, wherein the indication of the arrangement identifies a first denomination of a type of currency and a second denomination of the type of currency,
   wherein the first denomination and the second denomination are selected to be generated in the arrangement based on a first value of the first denomination, a second value of the second denomination, and the adjusted value associated with the object.

6. The user device of claim 5, wherein the first denomination and the second denomination are selected to be generated in the arrangement based on the first denomination and the second denomination being identified as the one or more denominations.

7. The user device of claim 1, wherein the adjustment factor corresponds to at least one of:
   a tax rate that is associated with a type of the object and the location, or
   a tipping rate that is associated with a type of the object and the location.

8. The user device of claim 1, wherein the one or more processors are further configured to:
   receive, from the adjustment factor data source and based on a token manager application being installed on the user device or based on presence of a user account associated with the token manager application, updates to the adjustment factor.

9. A non-transitory computer-readable medium storing a set of instructions, the set of instructions comprising:
one or more instructions that, when executed by one or more processors of a user device, cause the user device to:
capture, via a camera on the user device, a first image associated with a video stream related to one or more denominations of physical currency in possession by a user;
process, based on using an image processing model associated with the user device, the first image,
wherein the image processing model uses an image processing technique performed by the user device;
generate, based on processing the first image, information related to the one or more denominations;
capture, by the user device, object information associated with an object of a potential transaction,
wherein the object information identifies a value associated with the object, a type of the object, and a location of the object, and
wherein the location of the object is determined by a sensor device of the user device;
determine, based on the type of the object and the location, and based on a query to an adjustment factor data source, an adjustment factor associated with a transaction involving the object;
determine, based on the value and the adjustment factor, an adjusted value of the object;
determine, based on the adjusted value, an arrangement of the one or more denominations that may be utilized in the transaction; and,
output an indication of the arrangement,
wherein outputting the indication comprises:
augmenting the arrangement via augmented reality; and
outputting information associated with the augmented reality.

10. The non-transitory computer-readable medium of claim 9, wherein the object information is received in association with a read of a barcode, via the user device, associated with the object,
wherein the read of the barcode generates the object information.

11. The non-transitory computer-readable medium of claim 9, wherein the arrangement includes a first denomination of a type of currency and a second denomination of the type of currency, and
wherein the first denomination and the second denomination are selected to be included in the arrangement based on a first value of the first denomination, a second value of the second denomination, and the value associated with the object.

12. The non-transitory computer-readable medium of claim 11, wherein the first denomination and the second denomination are selected to be generated in the arrangement based on the first denomination and the second denomination being identified as the one or more denominations.

13. The non-transitory computer-readable medium of claim 9, wherein the one or more instructions, that cause the user device to determine the adjustment factor, cause the user device to:
identify, via the adjustment factor data source, the adjustment factor based on the adjustment factor being mapped to the location.

14. The non-transitory computer-readable medium of claim 9, wherein the adjustment factor corresponds to at least one of:
a tax rate associated with the location, or
a tipping rate associated with the location.

15. A method for providing transaction information associated with an object of a potential transaction, comprising:
capturing, via a camera on a device, a first image associated with a video stream related to one or more denominations of physical currency in possession by a user;
processing, by the device and based on using an image processing model associated with the device, the first image,
wherein the image processing model uses an image processing technique performed by the device;
generating, by the device and based on processing the first image, information related to the one or more denominations;
capturing, by the device and via an application associated with the device, a second image associated with object information related to an object,
wherein the object information identifies a value associated with the object and a location of the object, and
wherein the location of the object is determined by a sensor device of the device;
determining, by the device and based on a query to an adjustment factor data source, an adjustment factor that is associated with transactions performed in a region of the location;
determining, by the device and based on the value and the adjustment factor, an adjusted value associated with the object;
generating, by the device and based on the adjusted value, an arrangement of the one or more denominations for a transaction involving the object and the one or more denominations,
wherein the arrangement indicates arrangement of the one or more denominations; and
outputting, by the device and via a user interface of the application, an indication of the arrangement of the one or more denominations to assist a user with engaging in the transaction,
wherein outputting the indication comprises:
augmenting the arrangement of the one or more denominations via augmented reality; and
outputting information associated with the augmented reality.

16. The method of claim 15, wherein the object information is received in association with a read of a barcode associated with the object, and
wherein the read is performed in association with a read operation of the application and the camera.

17. The method of claim 15, wherein the one or more denominations include a type of currency that is associated with the location.

18. The method of claim 15, wherein the arrangement includes a first denomination of a type of currency and a second denomination of the type of currency,
wherein the first denomination and the second denomination are selected to be generated in the arrangement based on a first value of the first denomination, a second value of the second denomination, and the value associated with the object.

19. The method of claim 15, wherein the adjustment factor corresponds to at least one of:
  a tax rate associated with a type of the object,
    wherein the type of the object is identified based on the object information; or
  a tipping rate associated with the type of the object.

20. The method of claim 15, wherein the information related to the one or more denominations identifies corresponding quantities associated with the one or more denominations.

* * * * *